UNITED STATES PATENT OFFICE.

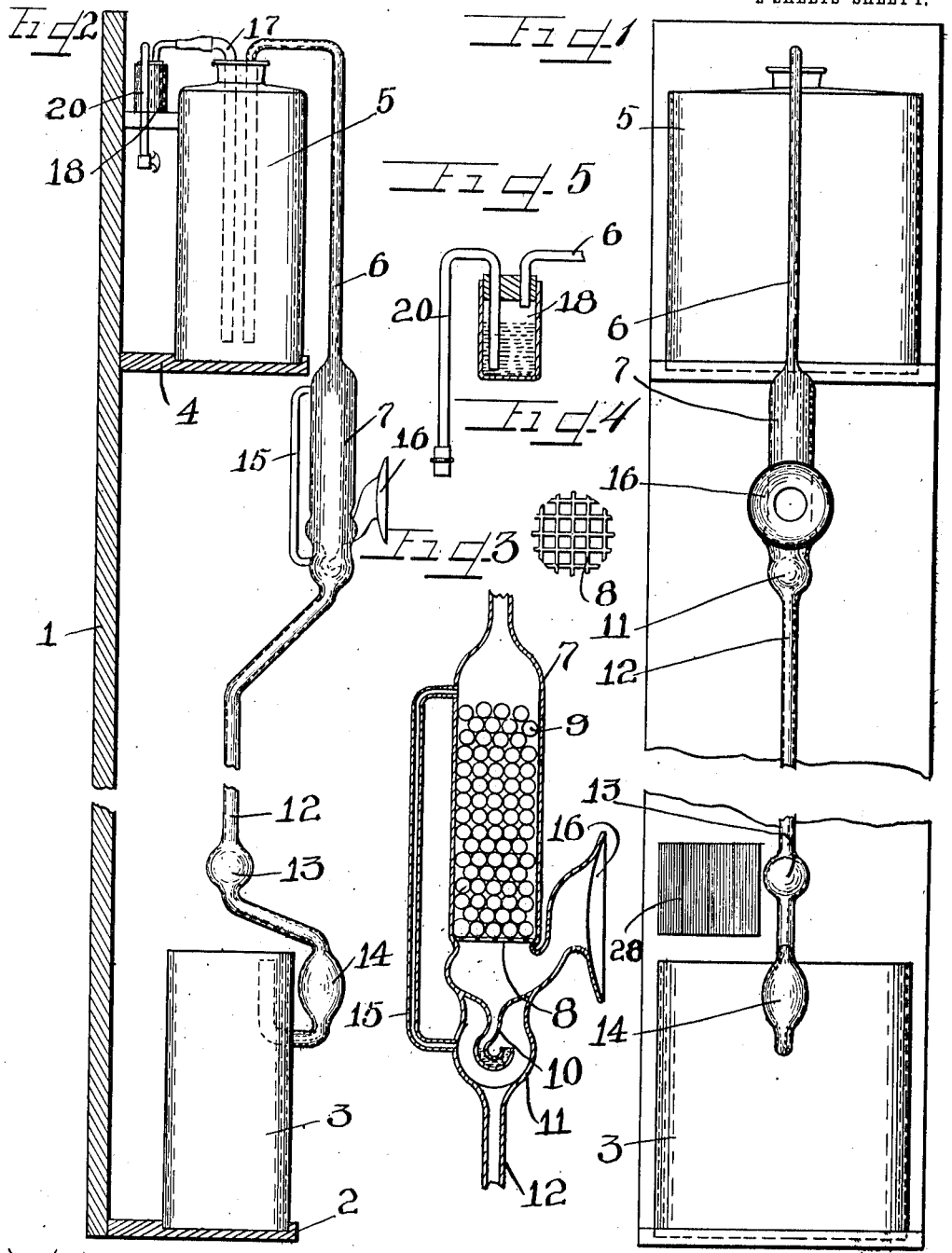

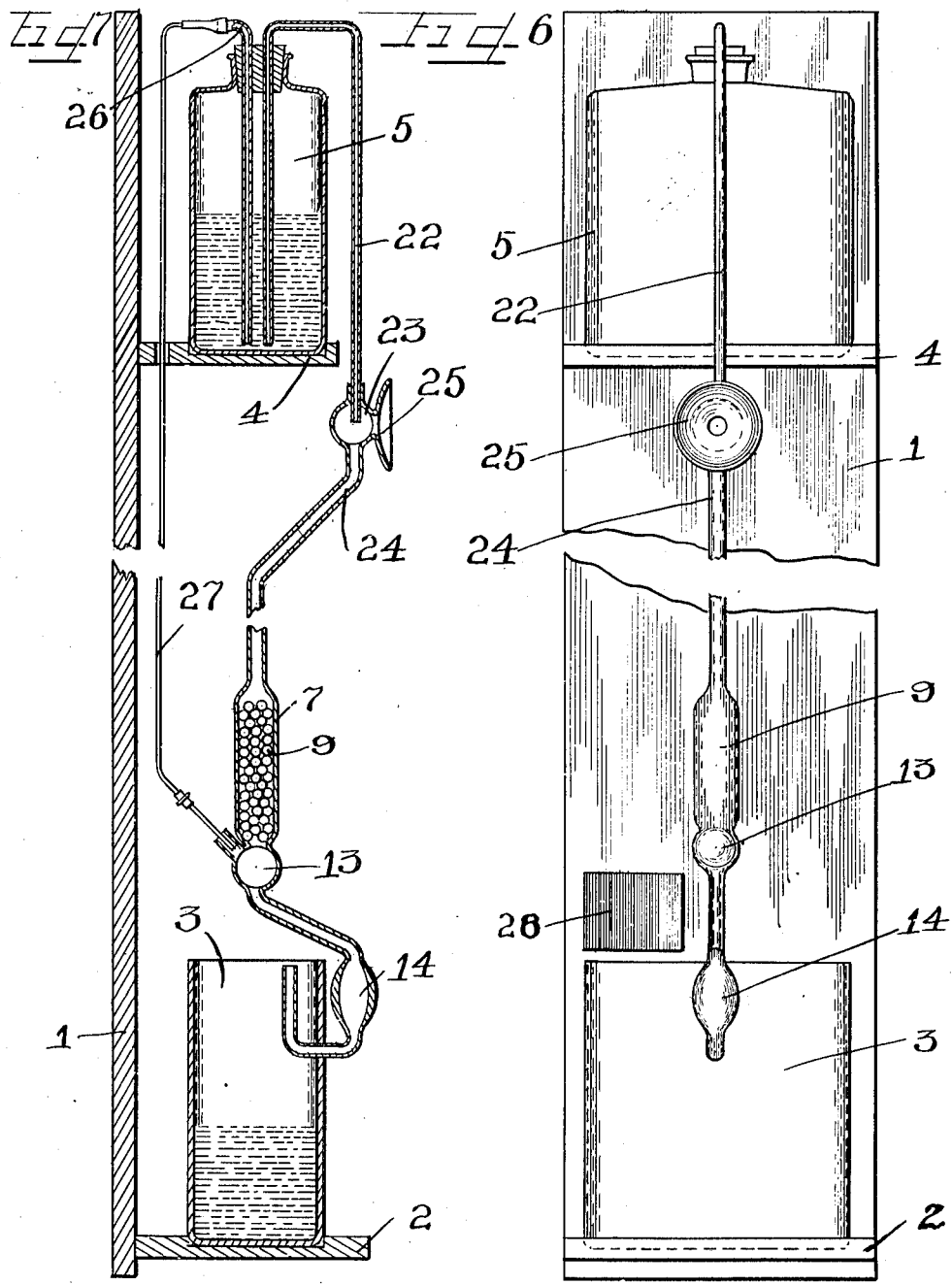

WALTER H. FLOOD, OF CHICAGO, ILLINOIS, ASSIGNOR TO LAWRENCE J. FLOOD, OF CHICAGO, ILLINOIS.

AIR-TESTING APPARATUS.

1,035,337. Specification of Letters Patent. Patented Aug. 13, 1912.

Application filed May 12, 1910. Serial No. 560,910.

*To all whom it may concern:*

Be it known that I, WALTER H. FLOOD, a citizen of the United States, and a resident of the city of Chicago, in the county of Cook and State of Illinois, have invented certain new and useful Improvements in Air-Testing Apparatus; and I do hereby declare that the following is a full, clear, and exact description of the same, reference being had to the accompanying drawings, and to the numbers of reference marked thereon, which form a part of this specification.

The percentage of carbon dioxid in the atmosphere is usually a reasonably accurate measure of the impurity of the air, whether the contamination occurred from animal exhalations or from combustion or decay, and one of the most serious difficulties encountered by those who would urge upon the public the great importance of proper sanitary precautions for maintaining purity of the air is the difficulty experienced in clearly illustrating the real condition of the air. As to the proportion of impurities contained therein in the majority of public buildings, schools, churches and the home, the only test for determining the condition of the atmosphere is the general feeling of discomfort occasioned when the air becomes extremely impure.

The object of this invention is to provide a mechanism or indicator by the use of which the condition of the atmosphere as to its carbon dioxid content can be instantly determined by observation and in which chemical means are employed for indicating to the eye the purity or impurity of the air.

It is a further object of the invention to provide an exceedingly cheap, simple and reliable testing instrument whereby the relative condition of purity or impurity of the air may be determined by means of a chemical reaction produced by the air drawn into the instrument and whereby the relative purity of the air may be determined by color test.

The invention consists in the matters hereinafter described and more fully pointed out and defined in the appended claims.

In the drawings: Figure 1 is a front elevation of a testing instrument embodying my invention. Fig. 2 is a side elevation thereof, showing the frame or support in section. Fig. 3 is an enlarged central section of a part of an instrument embodying my invention. Fig. 4 is an enlarged bottom plan view of a screen upon which the glass beads are supported. Fig. 5 is a central section of another feature of my invention. Fig. 6 is a front elevation of a slightly modified construction. Fig. 7 is a central vertical section thereof similar to Fig. 2.

As shown in the drawings: 1, indicates the panel or wall board provided at its bottom with a bracket 2, on which is supported the collecting receptacle 3, of glass or other suitable material. Near the top of said wall board is a second bracket 4, on which is supported a bottle, receptacle or flask 5, containing a solution of barium hydroxid colored pink with phenol phthalein. This solution is to be provided also as a standard mixture, so that the solution in all instances will be the same and of the same identical shade of color. A siphon pipe 6, extends at one end into the said flask 5, and at the other end depends therefrom and is integrally connected there with what I have termed an "absorber" 7, which consists, as shown, of a glass bulb or receptacle of relatively large diameter as compared with the pipe 6, and in which and supported on a grating 8, of glass or other suitable material is a large number of glass beads 9. Extending below the grating 8, is a discharge pipe 10, from the absorber, which is restricted in size and the lower end thereof curved upwardly to afford a liquid seal at all times. Surrounding said discharge end 10, is a bulb 11, the pipe 12, from which extends downwardly to the container 3, and may have one or more enlargements 13, and 14, therein to collect the liquid passing from the flask 5. As shown, a pipe 15, connects the bulb 11, with the upper end of the absorber and a funnel 16, opens into the absorber below the grating, the inlet pipe being directed downwardly to prevent the escape of any liquid therefrom.

The bottle or flask 5, in the construction shown in Figs. 1 and 2, is sealed, but the atmospheric pressure is maintained constant by means of a pipe 17, which extends through the stopper of said flask to near the bottom thereof and which is connected in the stopper of a flask 18, containing any suitable liquid or solid capable of collecting or absorbing the carbon dioxid admitted thereinto through the pipe 20, the latter of which is provided with a valve, the closing of which serves to arrest the operation of the instrument. The operation of this part of my device is as follows: The instrument is set by means of the valve so that about one drop per minute passes down the tube 6, and falls upon the glass beads in the absorber and passing therethrough and through the liquid seal 10, falls into the pipe 12, and thence to the collecting bulbs 13 and 14. Each drop of the solution falling upon the beads is spread over the surface thereof in an exceedingly thin film and is thereby most advantageously exposed to the air which flows into the absorber through the funnel 16, and is thence drawn upwardly among and through the beads by the vacuum or partial vacuum produced by the fall of the successive drops from the liquid seal 10. As the liquid falls drop by drop into the pipe 12, at measured intervals, the air is exhausted through the pipe 15, from the top of the absorber and a certain quantity thereof is carried down into the tube 12, between successive drops of the liquid and as the said tube is wetted by the downwardly flowing drops, the liquid is again spread over a large area of the tube and presented for chemical action. In this manner all the air drawn into the apparatus is relieved of its carbon dioxide and the downwardly dropping liquid fades in color in proportion to the amount of the carbon dioxid received. When collected in the collection chamber 13 or 14 in any considerable quantity, the color thereof is plainly comparable with the colors on a scale 28 marked plainly on the receptacle 3, or on the bracket board 1, each of which represents a definite proportion of the carbon dioxide in the air and which indicates clearly when the air has been contaminated to a point to render the use thereof unsanitary.

The construction shown in Figs. 6 and 7, is substantially the same with the exception that the absorber instead of being connected in somewhat close relation with the flask 5, is located but a short distance above the collecting flask 3. In this instance, the siphon 22, is connected through the stopper of the flask 5, as before described and is connected in the bulb 23, so that the liquid falls from the end of the siphon 22, drop by drop into the pipe 24, each drop carrying downwardly therewith a quantity of air admitted through the funnel 25. The air thus passes down to the absorber with the successive drops of liquid which, being spaced a definite interval apart, enables a definite quantity of air to be taken into the pipe between the successive drops and therein exposed to the liquid film collected on the sides of the tube. The air is thus carried downwardly to the absorber and passed therethrough and returned, divested of its carbon dioxid, through the pipe 26, of the flask by means of the pipe 27, so that at all times the flask 5, is supplied with air at atmospheric pressure from which all carbon dioxid has been removed. The test for purity is as before described. The liquid, as it collects, after the exposure to the action of the carbon dioxid, is of a paler color than in the flask 5, and its purity may be determined by reference to an appropriate scale of colors conveniently placed.

The instrument in its essential features consists of a glass tube down which a chemical solution capable of being visibly affected by the carbon dioxid, as, for instance, barium hydroxid colored pink with phenol phthalein, is allowed to pass drop by drop, each drop filling a portion of the tube and eventually discharging into a suitable container where its variation in appearance from the standard mixture can be determined by inspection.

Of course, if the discharge tube be sufficiently long, it might be possible to dispense with the absorber or in certain instances, the length of the glass tube may be materially shortened and the absorber properly connected with comparatively short tubes. In either arrangement, the carbon dioxid of the air combines with the barium hydroxid, forming barium carbonate, which is insoluble. The alkalinity of the solution is therefore diminished, causing the pink color of the phenol phthalein and barium hydroxid to fade, and, of course, the variation in color is dependent wholly upon the amount of carbon dioxid combined therewith.

For convenience, I have adopted a set solution of about one gram of barium hydroxid to one liter of water and sufficient of the phenol phthalein solution to give it a pink color to correspond with a standard color adopted. Preferably the solution is so standardized as to become colorless for a certain content of carbon dioxid in the atmosphere, as, for example, ten or twelve parts of carbon dioxid to ten thousand parts of air. Of course, however, other indicators and affording different colors than phenol phthalein may be used, in which instance, of course, a corresponding color scale must be used at the point of comparison.

Of course, I am aware that my invention is capable of embodiment in an almost infinite variety of forms and I have not attempted to indicate more than two preferred and very simple forms and embodiments of my invention and I therefore do not purpose limiting myself otherwise than necessitated by the prior art, for I believe that I am entitled to claim broadly any means whereby the carbon dioxid content of the atmosphere may be determined by the chemical action of a measurable quantity thereof upon a suitable medium and the comparison of the resultant compound or mixture with a test scale.

I claim as my invention:

1. In an air testing apparatus, an inclosed flask containing a chemical solution capable of being visibly affected by the action of impurities in air, a siphon arranged to deliver the solution from the flask drop by drop at timed intervals, an absorber adapted to receive the solution, means within the absorber adapted to spread each drop of the liquid in a thin film, means admitting air to the absorber, a collecting chamber arranged below the absorber and adapted to receive the treated solution therefrom, and a color chart adapted to indicate the purity of the air by comparison with the color of the treated solution contained in the collecting chamber.

2. In an air testing apparatus, a chemical solution, a coloring matter therein, the tint of which varies with the proportion of carbon dioxid combined in the solution, means presenting a measurable quantity of said colored solution to a quantity of the air to be tested, a collection chamber and a color chart arranged opposite the collecting chamber and indicating the percentage of carbon dioxid for each of the tints in said color chart.

3. An air testing apparatus, embracing a flask for the test solution, a siphon arranged to deliver the contents therefrom drop by drop at timed intervals, an air pipe into which said drops fall, including a supply of air between successive drops, an absorber of relatively large capacity, glass beads therein over which the solution is spread in a relatively thin film in the presence of the air to be tested, a collecting chamber arranged below the absorber and adapted to receive the solution therefrom, and a color chart arranged adjacent the collecting chamber and marked to indicate the proportion of carbon dioxid necessary to produce each given tint.

4. In an air testing apparatus, a flask containing barium hydroxid colored with phenol phthalein, a pipe for discharging the same therefrom drop by drop at timed intervals, means for spreading the drops of liquid into films, means for admitting the air thereto for testing and for subjecting each drop in the form of a thin film to the action of the air, a chamber for collecting the treated solution, and a color chart for comparing the treated solution to indicate the quantity of carbon dioxid indicated thereby.

5. In an air testing apparatus, a flask containing an alkaline solution colored with phenol phthalein, a discharge pipe extending into said flask and depending therefrom, means for producing an intermittent flow of the colored solution through the pipe at constant intervals, an absorber adapted to receive the solution when discharged from the pipe, beads in the absorber adapted to spread each drop of the solution in a thin film to be treated by the air, a chamber for collecting the treated solution and a color chart for comparing with the color of the treated solution.

6. In an air testing apparatus, a flask containing a chemical solution capable of being visibly affected by carbon dioxid, a pipe for discharging the solution therefrom at timed intervals, an absorber adapted to receive the liquid as it leaves the discharge pipe, means within the absorber for spreading the discharged solution into thin films to assist in completely subjecting the discharge to the action of the air, a chamber for collecting the treated solution, and a color chart adapted to indicate the proportion of carbon dioxid to produce a given tint.

7. In an air testing apparatus, a flask containing a chemical solution capable of being visibly affected by the impurities of the air, a pipe adapted to discharge the solution drop by drop, an absorber adapted to receive the liquid as it is discharged from the pipe, means within the absorber adapted to facilitate the action of the air upon the solution treated, a pipe adapted to convey the treated solution away from the absorber, a plurality of collecting chambers in the pipe adapted to receive the treated solution, and a color chart arranged adjacent the collecting chambers and marked to indicate the proportion of impurities necessary to produce each given tint.

8. In an air testing apparatus, a flask containing an indicating solution, a discharge pipe therefor adapted to discharge the solution at a predetermined rate, an absorber connected therewith, an apertured bottom in said absorber, means within the absorber acting to spread the solution delivered to the absorber in a thin film, a funnel opening into the absorber below the apertured bottom, a bulb beneath the funnel adapted to receive the treated solution from the container, a liquid seal between the container and the bulb, means permitting a flow of air from the absorber to the bulb, a pipe connected to the bulb, collecting chambers in the pipe, and a color chart for comparing with the treated solution in the collecting chambers.

In testimony whereof I have hereunto subscribed my name in the presence of two subscribing witnesses.

WALTER H. FLOOD.

Witnesses:
 LAWRENCE REIBSTEIN,
 H. E. HANNAH.